US008910057B2

(12) United States Patent
Hornback, Jr. et al.

(10) Patent No.: US 8,910,057 B2
(45) Date of Patent: Dec. 9, 2014

(54) ACCESSING WINDOW PIXEL DATA FOR APPLICATION SHARING

(75) Inventors: Raymond R. Hornback, Jr., Lexington, KY (US); Kevin Solie, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/616,661

(22) Filed: Sep. 14, 2012

(65) Prior Publication Data

US 2013/0014029 A1 Jan. 10, 2013

Related U.S. Application Data

(63) Continuation of application No. 13/113,903, filed on May 23, 2011, now abandoned.

(51) Int. Cl.
*G06F 3/00* (2006.01)
*G09G 5/36* (2006.01)
*G09G 5/14* (2006.01)
*G06F 3/14* (2006.01)
*G06Q 10/10* (2012.01)

(52) U.S. Cl.
CPC .......... *G06F 3/1454* (2013.01); *G09G 2360/08* (2013.01); *G09G 5/363* (2013.01); *G09G 2360/04* (2013.01); *G09G 2354/00* (2013.01); *G06Q 10/10* (2013.01); *G09G 5/14* (2013.01); *G09G 2360/02* (2013.01)
USPC ........................................... 715/753; 715/759

(58) Field of Classification Search
CPC .................................. G06F 3/048; G06F 3/00
USPC ..................................................... 715/753, 759
See application file for complete search history.

(56) References Cited

U.S. PATENT DOCUMENTS

| | | | |
|---|---|---|---|
| 6,285,363 B1 * | 9/2001 | Mairs et al. | 715/751 |
| 6,308,199 B1 * | 10/2001 | Katsurabayashi | 709/204 |
| 7,028,266 B2 | 4/2006 | Ben-Shachar et al. | |
| 7,260,784 B2 | 8/2007 | Crichton | |
| 7,478,339 B2 | 1/2009 | Pettiross et al. | |
| 7,595,810 B2 | 9/2009 | Louch | |
| 2005/0033817 A1 | 2/2005 | Wei | |
| 2006/0161623 A1 | 7/2006 | Montgomery et al. | |
| 2010/0131868 A1 | 5/2010 | Chawla et al. | |

* cited by examiner

*Primary Examiner* — Andrea Leggett
(74) *Attorney, Agent, or Firm* — David A. Dagg

(57) ABSTRACT

Screen sharing in which image pixel data operable to display one or more user interface windows associated with at least one shared application is retrieved from a memory. The retrieving excludes image pixel data operable to display at least one other display object currently contained in a user interface of said computer. The retrieved image pixel data is combined into a shared image.

19 Claims, 6 Drawing Sheets

US 8,910,057 B2

ACCESSING WINDOW PIXEL DATA FOR APPLICATION SHARING

CROSS REFERENCE TO RELATED APPLICATIONS

The present application is a Continuation application under 35 U.S.C. 120 of commonly owned prior application Ser. No. 13/113,903, filed on May 23, 2011 in the names of Raymond R. Hornback, Jr. et al., currently pending, all disclosures of which are hereby included by reference.

BACKGROUND OF THE INVENTION

The present invention relates generally to collaboration software and systems, and more specifically to sharing screen data among multiple computers during a collaborative on-line session.

BRIEF SUMMARY

A screen sharing technique is disclosed in which image pixel data operable to completely display one or more user interface windows associated with at least one shared application is selectively retrieved by a collaboration application from a memory in a computer. The disclosed retrieving is selective, in that it only retrieves the image pixel data for windows associated with the shared application, and excludes from the retrieval image pixel data operable to display at least one other display object currently contained in a graphical user interface of the computer. The retrieved image pixel data is combined into a shared composite image for distribution from the computer to one or more other computers of other users participating in an on-line collaboration session.

BRIEF DESCRIPTION OF THE SEVERAL VIEWS OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

Figure 1:
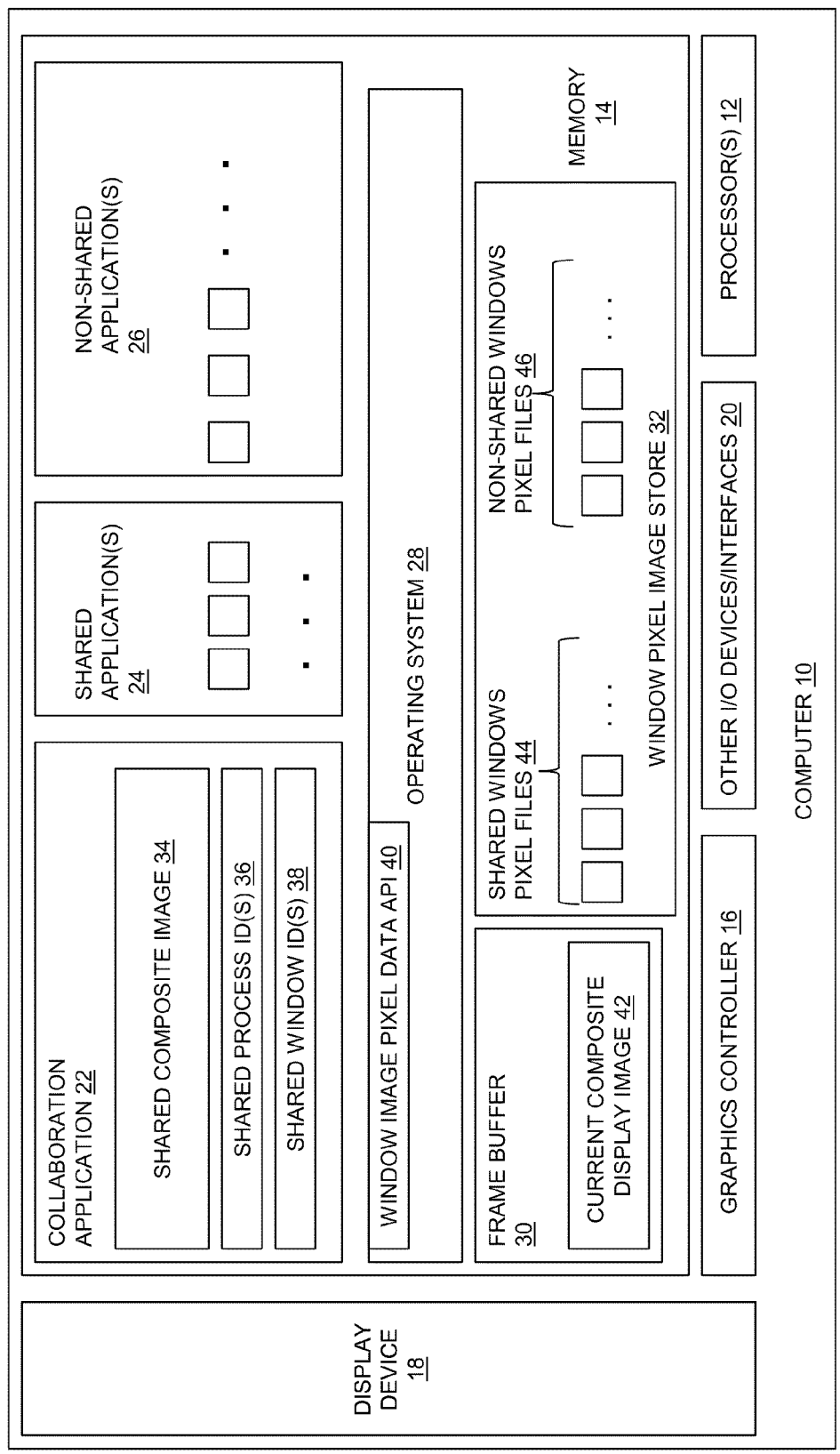
FIG. 1 is a first block diagram showing an example of structure of components in an illustrative embodiment.

FIG. 1 is a first block diagram showing an example of the structure of components in an illustrative embodiment. As shown in FIG. 1, a Computer 10 includes at least one Processor 12, a Memory 14, a Graphics Controller 16, a Display Device 18, and other I/O Devices and/or Interfaces 20. In the example of FIG. 1, the Memory 14 stores a Collaboration Application 22, one or more Shared Application(s) 24, and one or more Non-Shared Application(s) 26. The Memory 14 also may store an Operating System 28, a Frame Buffer 30 and a Window Pixel Image Store 32. The Collaboration Application includes and/or has access to a Shared Composite Image 34, one or more Shared Process Identifiers (IDs) 36, and one or more Shared Window Identifiers (IDs) 38. The Operating System 28 may include a Window Image Pixel Data Application Programming Interface (API) 40. A Current Composite Display Image 42 is shown within the Frame Buffer 30.

The Window Pixel Image Store 32 stores a number of files or the like, each containing a complete set of pixels for displaying a corresponding user interface window currently present within the graphical user interface of Computer 10, a current view of which is displayed on the Display Device 18. Accordingly, each pixel file in the Window Pixel Image Store 32 contains a complete set of image pixel data operable to completely display a corresponding window that is present within the graphical user interface of Computer 10 regardless of whether the window is currently obscured, either partly or completely, by another window or other user interface component. Any specific type of graphical user interface may be provided by Computer 10 that includes window display objects, including but not limited to a virtual desktop or the like.

The pixel files stored within the Window Pixel Image Store 32 include Shared Window Pixel Files 44 and Non-Shared Window Files 46. Each of the Shared Window Pixel Image Files 44 contains the pixel data for completely displaying a user interface window owned or otherwise associated with at least one of the Shared Applications 24. Each of the Non-Shared Window Pixel Image Files 46 contains the pixel data for completely displaying a user interface window owned or otherwise associated only with one or more of the Non-Shared Applications 26.

The Current Composite Display Image 42 is a composite image used to display the current view of the user interface. Specifically, the Current Composite Display Image 42 is made up of only the pixels operable to represent the currently visible portions of display objects in the user interface (e.g. windows) through the Display Device 18. Accordingly, the Current Composite Display Image 42 is made up of the pixels used to generate a single screen currently displayed on the Display Device 18. The Current Composite Display Image 42 does not include pixel data operable to display any currently obscured portions of windows that are only partially visible in the current view.

In one embodiment, the Graphics Controller 16 operates to generate the Current Composite Display Image 42, responsive to pixel data including the window pixel data stored in the Window Pixel Image Store 32, and further responsive to a current visual arrangement of display elements within the user interface.

The Collaboration Application 22 operates to generate the Shared Composite Image 34 such that the Shared Composite Image 34 contains only the image data for user interface windows associated with one or more applications that are currently being shared through a collaboration session between the user of Computer 10 and the users of one or more other computers. The Shared Composite Image 34 is shared with one or more other computer systems during the collaboration session. The Colloboration Application 22 may, for example, be embodied as any appropriate type of application, such as a native application executing on the Computer 10, a browser-based Web application, or some other specific type of application.

Further with reference to the illustrative embodiment of FIG. 1, each identifier in the Shared Process ID(s) 36 uniquely identifies an application on Computer 10 that is currently being shared, i.e. a corresponding one of the Shared Applications 24. The Collaboration Application 22 may use the Shared Process ID(s) 36 to obtain the Shared Window ID(s) 38. For example the Collaboration Application 22 may obtain the Shared Window ID(s) 38 by passing the Shared Process ID(s) 36 to the Operating System 28, which then in turn passes back a list of window identifiers uniquely identifying a set of windows including only those windows associated with the application(s) indicated by the Shared Process ID(s) 36, e.g. a list of windows owned by the Shared Application(s) 24.

The Collaboration Application 22 uses the Shared Window ID(s) 38 to retrieve the Shared Window Pixel Images 44 from the Window Pixel Image Store 32. For example, the Window Image Pixel Data API 40 provided by Operating System 28 may accept window identifiers and return the corresponding pixel files from the Window Pixel Image Store 32. In such an embodiment, the Collaboration Application 22 operates to provide the Shared Window ID(s) 38 to the Window Image Pixel Data API 40, and accepts the returned Shared Window Pixel Image Files 44. The Collaboration Application 22 may then operate to combine the Shared Window Pixel Image Files 44 into a single composite image to be shared, shown in FIG. 1 by the Shared Composite Image 34.

While the Frame Buffer 30, Window Pixel Image Store 32, and Graphics Controller 16 are shown as separate blocks in FIG. 1, those skilled in the art will recognize that the disclosed system is not limited to such an arrangement. Accordingly, these logic blocks may be integrated into a single component or device, or otherwise combined or organized as appropriate for a given operational environment.

Figure 2:
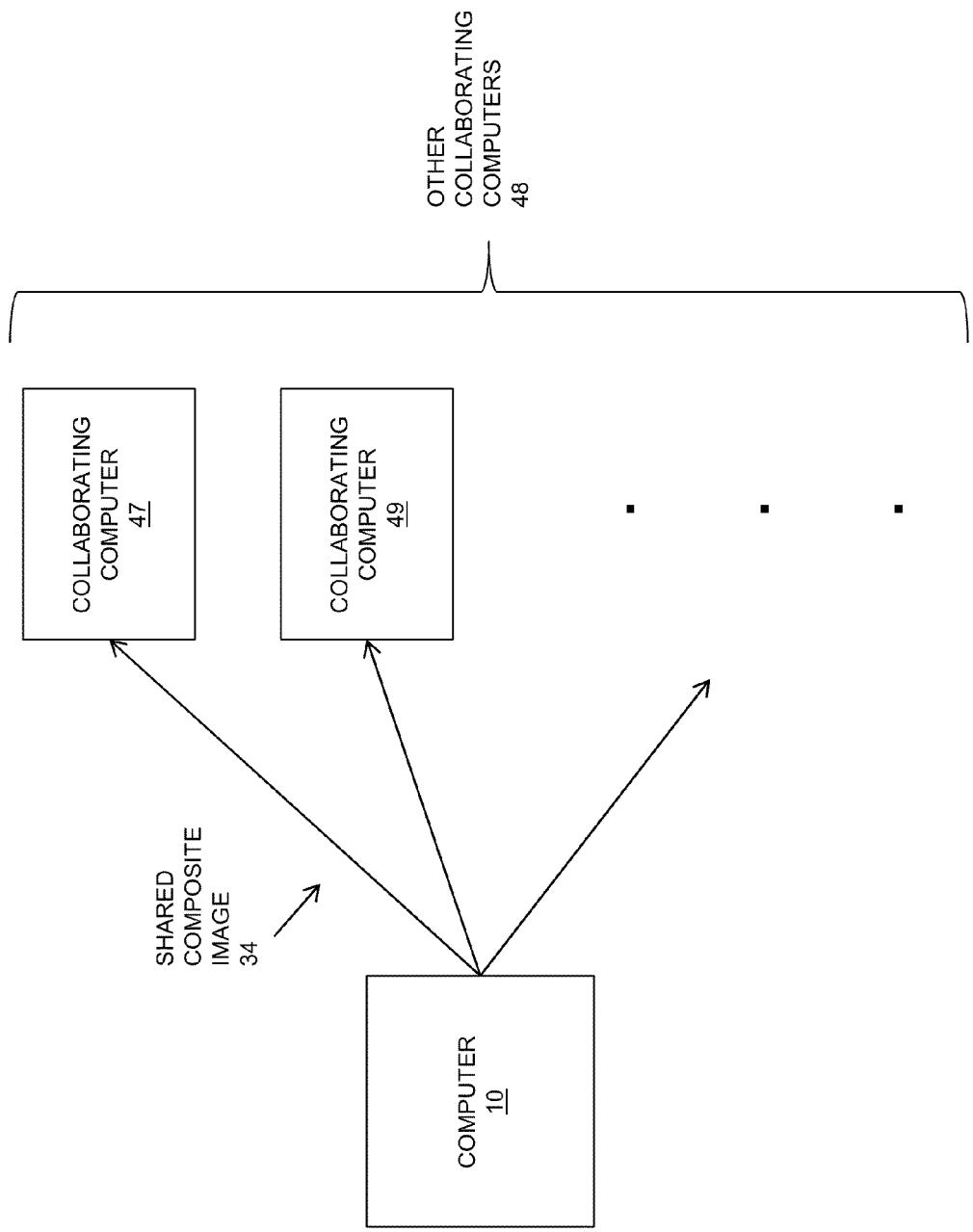
FIG. 2 is a block diagram showing an example of structure of components in an illustrative operational environment including the illustrative embodiment of claim 1.

FIG. 2 is a block diagram showing the structure of components in an illustrative operational environment including the illustrative embodiment of claim 1. As shown in FIG. 2, the Shared Composite Image 34 may be transmitted from Computer 10 to a number of other computer systems of other users participating in a collaboration session with the user of Computer 10, e.g. Other Collaborating Computer 48, shown for purposes of illustration including Collaborating Computer 47, Collaborating Computer 49, etc. The Shared Composite Image 34 may, for example, be a first image or key frame within the collaboration session, transmitted from the Computer 10 in a compressed file format, such as JPEG ("Joint Photographic Experts Group"), PNG ("Portable Network Graphics"), or any other appropriate format for a given implementation.

While for purposes of concise illustration FIG. 2 shows the Computer 10 transmitting the Shared Composite Image 34 to the Other Collaborating Computers 48, those skilled in the art will recognize that one or more server systems may be located between the Computer 10 and the Other Collaborating Computers 48. The Computer 10, Other Collaborating Computers 48 and any such servers may be communicably connected using any specific kind of data communication networks and/or protocols.

The Computer 10 of FIG. 1 and the Other Collaborating Computers 48 of FIG. 2 may each be embodied as or include any specific type of computer system and/or intelligent electronic device, such as a desktop, laptop, or palmtop computer system, or a personal digital assistant, cell phone, and/or other electronic device. The Display Device 18 may be any specific type of display device that is capable of displaying a graphical user interface including user interface window display objects, such as a liquid crystal display (LCD), cathode ray tube (CRT), interferometric modulator display (IMOD), light emitting diode (LED), or other specific type of display device.

Those skilled in the art will recognize that the Collaboration Application 22 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software and/or firmware. Those skilled in the art will further recognize that the Processor(s) 12 in Computer 10 may include one or more processors of any specific type, and that the Memory 14 may be embodied as any specific type of program code or data storage, such as volatile or non-volatile memory, operable to store program code executable on such processors and associated data.

Figure 3:
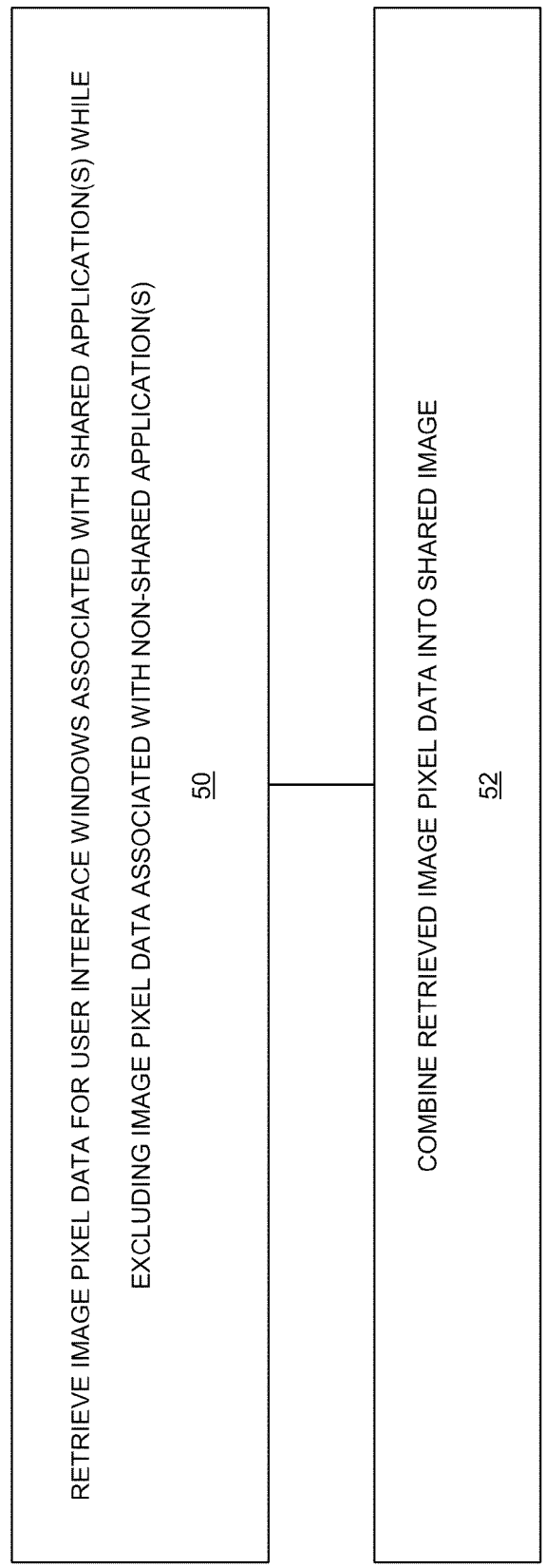
FIG. 3 is a first flow chart showing steps performed during operation of an illustrative embodiment.

FIG. 3 is a first flow chart showing steps performed during operation of an illustrative embodiment. The steps of FIG. 3 may, for example, be performed in whole or in part by the Collaboration Application 22 shown in FIG. 1. At step 50, the disclosed system retrieves image pixel data for user interface windows associated with one or more shared applications, while excluding image pixel data associated with non-shared applications. At step 52, the disclosed system combines all the image pixel data retrieved at step 50 into a shared image to be conveyed to the computer systems of other users participating in the collaboration session. With reference to the embodiment of FIG. 1, the Collaboration Application 22 may operate to combine the Shared Windows Pixel Files 44 returned by the Operating System 28 into the Shared Composite Image 34. For example, the Collaboration Application 22 may combine the Shared Windows Pixel Files 44 into the Shared Composite Image 34 such that the shared user interface windows corresponding to the Shared Windows Pixels Files 44 are represented in the same relative positions they currently have within the graphical user interface displayed to the user of Computer 10 through the Display Device 18. In one embodiment, the steps of FIG. 3 are performed periodically to refresh the contents of Shared Composite Image 34 to reflect the most current appearance and contents of the shared windows represented by the Shared Windows Pixel Files 44.

Figure 4:
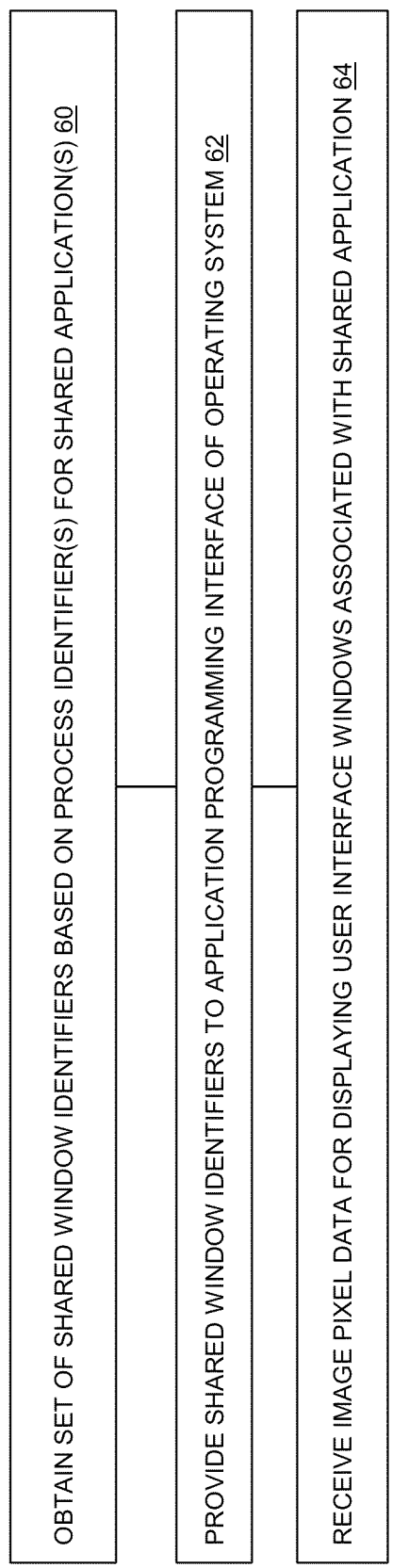
FIG. 4 is a second flow chart also showing steps performed during operation of an illustrative embodiment.

FIG. 4 is a second flow chart showing steps performed during operation of an illustrative embodiment. The steps shown in FIG. 4 are an example of steps that may be performed during step 50 of FIG. 3. The steps of FIG. 4 may, for example, be performed by the Collaboration Application 22 of FIG. 1. At step 60, the disclosed system obtains a set of shared window identifiers based on the process identifiers of one or more applications currently being shared in a collaboration session. For example, the Collaboration Application 22 may include or have access to Shared Process ID(s) 36, which includes a unique process identifier for each of the Shared Applications 24. In an alternative embodiment, the Collaboration Application 22 may operate by collecting a complete set of window identifiers for all windows currently within the user interface, and then select out only the identifiers for windows that are owned by the Shared Applications 24, responsive to the Shared Process ID(s) 36.

At step 62, the disclosed system passes the shared window identifiers obtained in step 60 as inputs to an application programming interface or the like that returns complete image pixel data for the windows corresponding to the window identifiers. For example, the Collaboration Application 22 may operate at step 62 to pass the Shared Window ID(s) 38 to the Operating System 28 through the Window Image Pixel Data API 40. At step 64, the disclosed system receives the complete image pixel data for only the windows indicated by the window identifiers passed to the application user interface at step 62, without any image pixel image data for any other windows present within the user interface. For example, at step 62 the Operating System 28 may return only the Shared Windows Pixel Files 44 to the Collaboration Application 22. By issuing a request at step 62 for only the pixel image data for windows that are owned by the applications being shared in the current collaboration session (i.e. Shared Applications 24), the Collaboration Application 22 excludes from the retrieval step 64 any pixel image data for windows owned by any non-shared applications (i.e. Non-Shared Applications 26).

Figure 5:
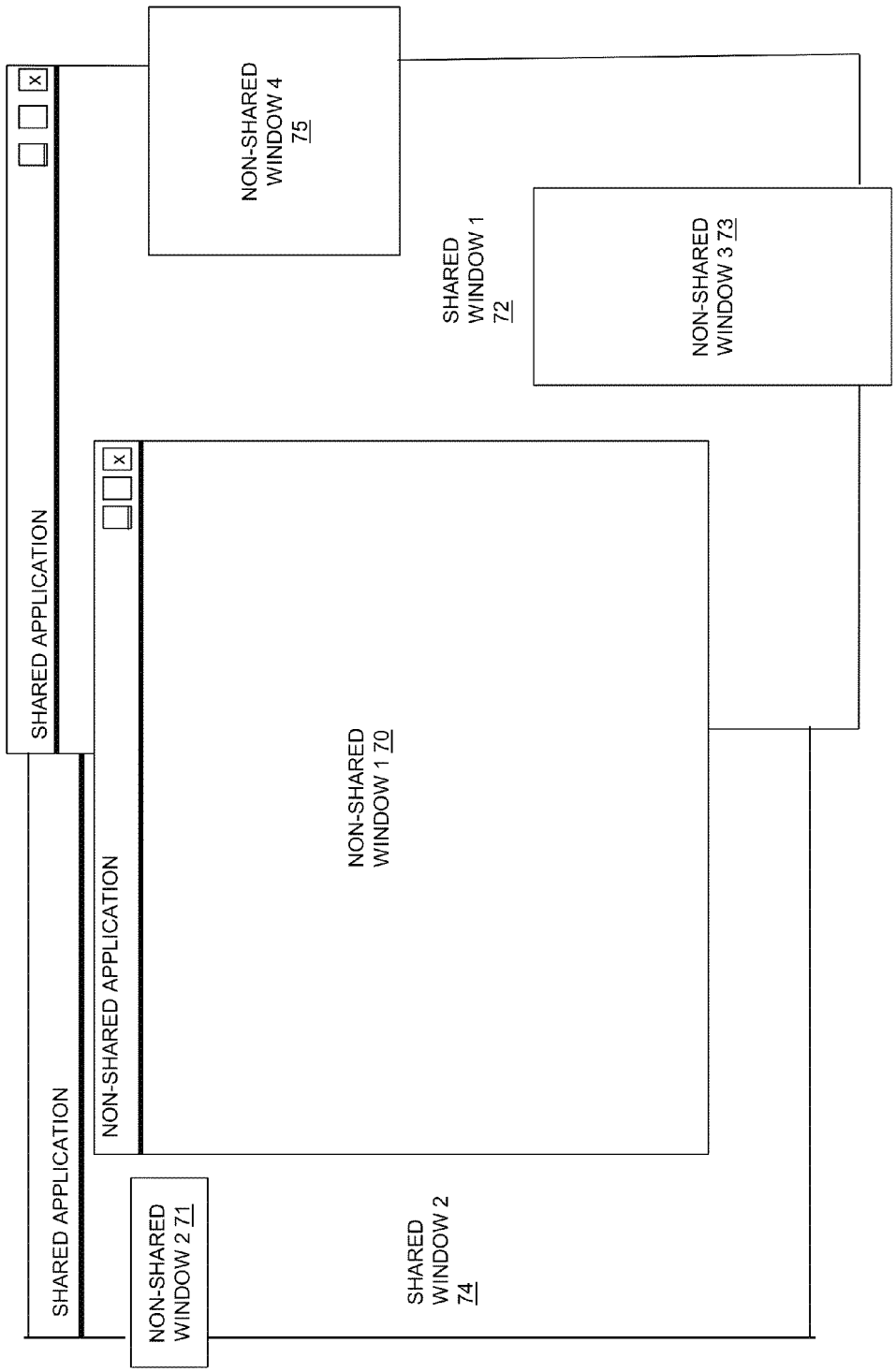
FIG. 5 is a screen shot showing at least a portion of a graphical user interface displayed by a first collaborating computer system consistent with an illustrative embodiment.

FIG. 5 is a screen shot showing at least a portion of a user interface as displayed by a first collaborating computer system consistent with an illustrative embodiment. The screen shot of FIG. 5 may, for example, be a portion of the current view of the graphical user interface displayed to the user of Computer 10 through the Display Device 18. As shown in FIG. 5, the current view of the user interface includes Non-Shared Window 1 70, Non-Shared Window 2 71, Non-Shared Window 3 73, Non-Shared Window 4 75, Shared Window 1 72, and Shared Window 2 74. For example, the shared windows Shared Window 1 72 and Shared Window 2 74 may be two windows owned by an application being shared during a collaboration session, and for example shown in the Shared Applications 24. The shared application may be any specific kind of application. The Non-Shared Windows 70, 71, 73 and 75 may be windows owned by a non-shared application contained in the Non-Shared Applications 26, or by any other process not associated with the application being shared through the collaboration session. In the example of FIG. 5, the user of Computer 10 is sharing the application that owns Shared Window 1 72 and Shared Window 2 74 with one or more other users through the Collaboration Application 22. However, because the application that owns Non-Shared Window 70 is not shared, the user of Computer 10 does not intend to share the contents of Non-Shared Window 70. For example, the Non-Shared Window 70 may be a pop-up window containing an instant messaging dialog between the user of Computer 10 and some other user.

Figure 6:
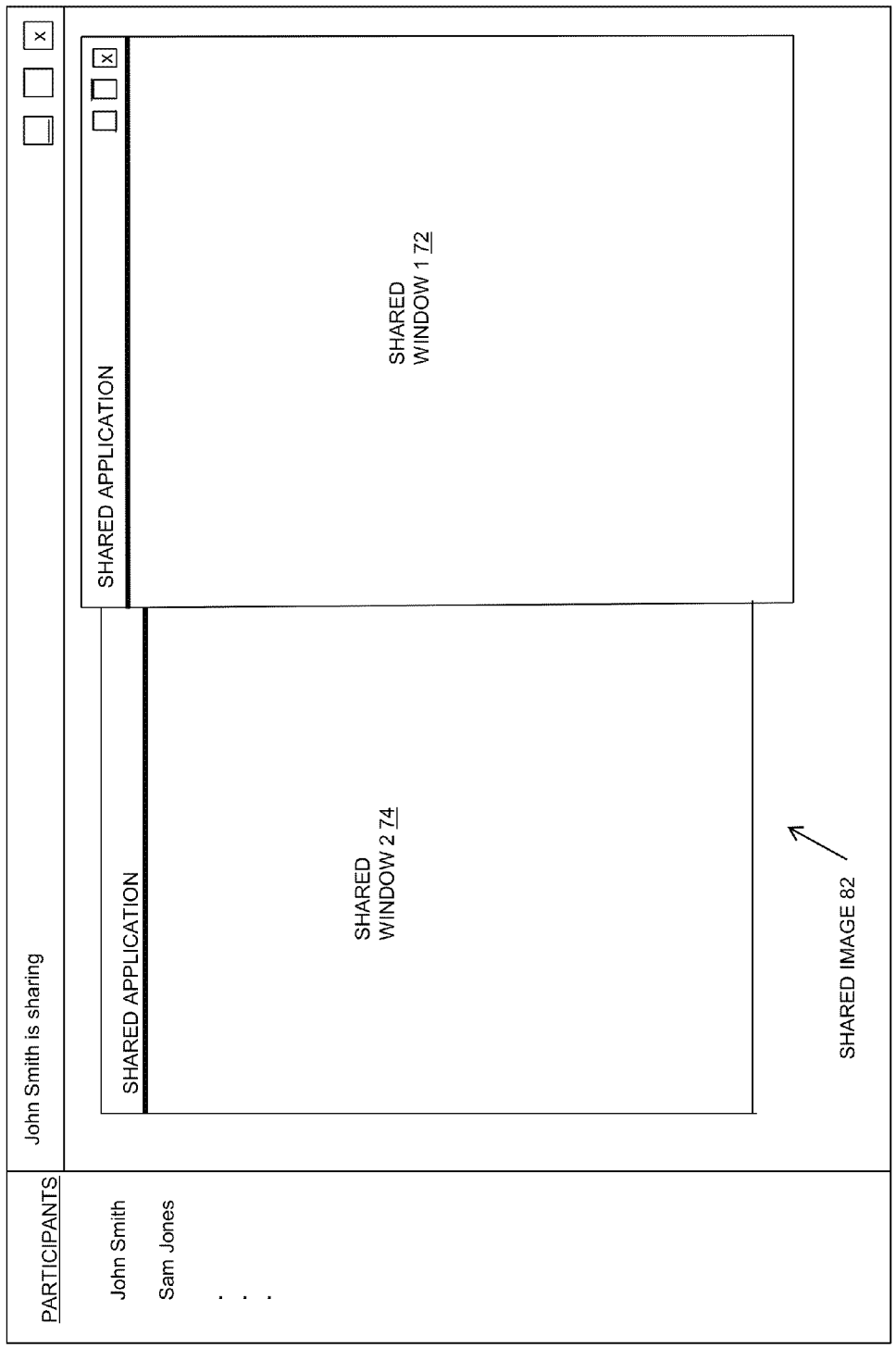
FIG. 6 is a screen shot showing at least a portion of a graphical user interface as displayed by a second collaborating computer system consistent with an illustrative embodiment.

FIG. 6 is a screen shot showing at least a portion of a user interface as displayed by a second collaborating computer system consistent with an illustrative embodiment. The screen shot of FIG. 6 may, for example, be a portion of the current view of the graphical user interface displayed to a user of one of the Other Collaborating Computers 48 shown in FIG. 2. As shown in FIG. 6, a Collaboration Application Viewer 80 includes Shared Image 82 generated from the Shared Composite Image 34 received from Computer 10. The Shared Image 82 includes the Shared Window 1 72 and Shared Window 2 74 in the same positions that they have within the user interface of Computer 10, but without the Non-Shared Window 70.

The disclosed system provides various advantages over other approaches to providing screen sharing. For example, in an approach to screen sharing that does not include the disclosed techniques, pixels for the shared image may be obtained from a frame buffer contained within or controlled by a video display device or controller. Such frame buffer pixels only reflect a current view of the user interface. The resulting shared image is exactly what is currently displayed on the sharing computer's screen, i.e. including all visible portions of application windows (for both shared and non-shared applications), desktop elements, backgrounds, etc., that have already been composited into the single composite image stored in the frame buffer and used by the video device to generate the current view. The disclosed system avoids problems arising from such an approach, allowing the sharing user to share only particular display elements, such as only a single window or only the windows owned by a single application.

For example, a user may wish to share only a particular word processing application. When the sharing user receives an incoming instant message, and the messaging window appears on top of the shared word processing window, the user does not wish to share the contents of the messaging window, since it may contain personal or sensitive information. To avoid sharing the contents of the message window, a screen sharing approach without the disclosed techniques may need to implement "occlusion detection", in which the screen sharing technology is responsible for monitoring the positions of all open windows and applications, for example via a windowing layer in the operating system, and determining if any part of the shared area is occluded by another application or window. When occlusion is detected, the resulting image may need to be "grayed out" in the area where the occlusion has occurred, in order to avoid sharing personal or sensitive information. As a result of such graying out, areas of the shared image appear to the sharing users as a solid gray color where the occlusion has occurred, at least until the sharing user removes the occluding display objects from his local user interface. The disclosed system advantageously avoids such an aesthetically unpleasant and disruptive approach for viewers in the collaborative session.

The disclosed system also avoids potential security concerns associated with the timing of occlusion detection. Due to the decoupled, asynchronous nature of an operating system's windowing layer with regard to the video device, the timing of any necessary occlusion detection is critical, and certain timing conditions may result in a failure to detect the presence of an occluding display object. If occlusion is not detected properly, and graying out is not performed with regard to such non-shared display objects, the unintentional sharing of a window or application may result.

For example, in a system that does not include the disclosed techniques, at the time an instant message is received a window may be generated that occludes a currently shared application window. If at the same time a capture of image pixel data from the frame buffer to be used in the shared image has already begun, the occlusion may not be detected until the pixels captured from the frame buffer are shared, and the instant messaging window inadvertently revealed to others in the sharing session prior to the occlusion being detected.

The disclosed system also avoids problems that may result from the increasingly prevalent use of transparent windows. A system that does not include the disclosed techniques, and that extracts shared pixels from a composite image stored within a frame buffer used to provide the current view of the user interface on a display device, may inadvertently allow any non-shared display objects located below a shared transparent window to be shared.

Accordingly, by selectively retrieving complete pixel image data for shared windows prior to the pixel data being composited into a display image representing only the current view of the user interface, including only visible portions of shared and non-shared display objects, the disclosed system alleviates various problems and increased complexity associated with occlusion detection, as well as disadvantages associated with "graying out" occluded areas in the shared image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to one or more flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   selectively retrieving, by a local computer from a memory, image pixel data operable to completely display one or more user interface windows associated with at least one shared application, by providing a set of shared window identifiers to an application programming interface provided by an operating system on said local computer, wherein each shared window identifier in said set of shared window identifiers identifies a corresponding one of said user interface windows associated with said shared application, wherein said selective retrieving is prior to said image pixel data operable to completely display said user interface windows associated with said at least one shared application being composited into a display image representing a current view in a user interface of said local computer, and wherein said selective retrieving excludes retrieval of image pixel data operable to display at least one non-shared display object currently at least partially obscuring said user interface windows associated with said shared application in said current view in said user interface of said local computer;

combining said retrieved image pixel data operable to display said user interface windows associated with said at least one shared application into a shared image; and distributing said shared image to at least one remote collaborating computer system for display by said collaborating computer system.

2. The method of claim 1, further comprising:
obtaining said set of shared window identifiers responsive to a process identifier associated with said shared application.

3. The method of claim 2, further comprising:
wherein said application programming interface returns said image pixel data operable to display said user interface windows associated with said shared application.

4. The method of claim 2, further comprising:
obtaining a set of all current window identifiers, said set of all current window identifiers including an identifier for each display object currently contained in said user interface of said computer; and
wherein said obtaining said set of shared window identifiers includes using said process identifier associated with said shared application to identify those of said set of all current window identifiers that are owned by said shared application.

5. The method of claim 1, wherein said selective retrieving of said image pixel data operable to completely display each of one or more user interface windows associated with at least one shared application is from a memory separate from a frame buffer used to send a current composite display image to a display device of said local computer.

6. The method of claim 1, wherein said user interface windows associated with said shared application are also currently contained in said user interface of said local computer.

7. The method of claim 1, wherein said at least one non-shared display object currently contained in a user interface of said computer excluded from said selective retrieving comprises a window associated with an application currently running on said computer other than said shared application.

8. The method of claim 1, wherein said at least one non-shared display object currently contained in said user interface of said local computer excluded from said retrieving comprises a graphical user interface element associated with an operating system on said local computer.

9. The method of claim 1, further comprising:
transmitting said shared image from said local computer to a plurality of collaborating computer systems for display during a collaboration session.

10. A system comprising:
a local computer including at least one processor and a memory, said memory storing collaboration application program logic, said collaboration program logic operable when executed to share portions of a user interface among multiple computers by
selectively retrieving, from said memory, image pixel data operable to completely display one or more user interface windows associated with at least one shared application, by providing a set of shared window identifiers to an application programming interface provided by an operating system on said local computer, wherein each shared window identifier in said set of shared window identifiers identifies a corresponding one of said user interface windows associated with said shared application, wherein said selective retrieving is prior to said image pixel data operable to completely display said user interface windows associated with said at least one shared application being composited into a display image representing a current view in a user interface of said local computer, and wherein said selective retrieving excludes retrieval of image pixel data operable to display at least one non-shared display object currently at least partially obscuring said user interface windows associated with said shared application in said current view in said user interface of said local computer, combining said retrieved image pixel data operable to display said user interface windows associated with said at least one shared application into a shared image, and distributing said shared image to at least one remote collaborating computer system for display by said collaborating computer system.

11. The system of claim 10, said collaboration program logic further operable when executed to share portions of a user interface among multiple computers by obtaining said set of shared window identifiers responsive to a process identifier associated with said shared application.

12. The system of claim 11, further comprising:
wherein said application programming interface returns said image pixel data operable to display said user interface windows associated with said shared application.

13. The system of claim 11, said collaboration program logic further operable when executed to share portions of a user interface among multiple computers by obtaining a set of all current window identifiers, said set of all current window identifiers including an identifier for each display object currently contained in said user interface of said computer, and wherein said obtaining said set of shared window identifiers includes using said process identifier associated with said shared application to identify those of said set of all current window identifiers that are owned by said shared application.

14. The system of claim 10, wherein said selectively retrieving said image pixel data operable to completely display each of one or more user interface windows associated with at least one shared application is from a memory separate from a frame buffer used to send a current composite display image to a display device of said local computer.

15. The system of claim 10, wherein said user interface windows associated with said shared application are also currently contained in said user interface of said local computer.

16. The system of claim 10, wherein said at least one non-shared display object currently contained in a user interface of said computer excluded from said selective retrieving comprises a window associated with an application currently running on said computer other than said shared application.

17. The system of claim 10, wherein said at least one non-shared display object currently contained in said user interface of said local computer excluded from said retrieving comprises a graphical user interface element associated with an operating system on said local computer.

18. The system of claim 10, said collaboration program logic further operable when executed to share portions of said user interface among multiple computers by transmitting said shared image from said local computer to a plurality of collaborating computer systems for display during said collaboration session.

19. A computer program product comprising:
   at least one non-transitory computer readable storage medium having screen sharing program code embodied thereon, the program code comprising
      program code for selectively retrieving, from said memory, image pixel data operable to completely display one or more user interface windows associated with at least one shared application in a current view in a user interface of a local computer, by providing a set of shared window identifiers to an application programming interface provided by an operating system on said local computer, wherein each shared window identifier in said set of shared window identifiers identifies a corresponding one of said user interface windows associated with said shared application, wherein said selective retrieving is prior to said retrieval of image pixel data operable to completely display said user interface windows associated with said at least one shared application being composited into a display image representing a current view in a user interface of said local computer, and wherein said selective retrieving excludes image pixel data operable to display at least one non-shared display object currently at least partially obscuring said user interface windows associated with said shared application in said current view in said user interface of said local computer, and
      program code for combining said retrieved image pixel data operable to display said user interface windows associated with said at least one shared application into a shared image, and
   program code for distributing said shared image to at least one remote collaborating computer system for display by said collaborating computer system.

* * * * *